(12) United States Patent
Rade-Kukic et al.

(10) Patent No.: US 11,297,856 B2
(45) Date of Patent: Apr. 12, 2022

(54) **GLUTEN-FREE PASTA COMPRISING *BRASSICACEAE* SEED PROTEIN**

(71) Applicant: NESTEC S.A., Vevey (CH)

(72) Inventors: Koraljka Rade-Kukic, Lafayette, CA (US); Luis Roberto King, Pully (CH); Hugo Gloria-Hernandez, Vina del Mar (CL)

(73) Assignee: Societe des Produits Nestle S.A., Vevey (CH)

( * ) Notice: Subject to any disclaimer, the term of this patent is extended or adjusted under 35 U.S.C. 154(b) by 32 days.

(21) Appl. No.: 15/772,420

(22) PCT Filed: Oct. 31, 2016

(86) PCT No.: PCT/EP2016/076257
§ 371 (c)(1),
(2) Date: Apr. 30, 2018

(87) PCT Pub. No.: WO2017/076815
PCT Pub. Date: May 11, 2017

(65) Prior Publication Data
US 2018/0317530 A1  Nov. 8, 2018

(30) Foreign Application Priority Data
Nov. 5, 2015 (EP) .................... 15193164

(51) Int. Cl.
*A21D 13/066* (2017.01)
*A21D 2/26* (2006.01)
(Continued)

(52) U.S. Cl.
CPC ............. *A23L 7/11* (2016.08); *A23L 7/109* (2016.08); *A23V 2002/00* (2013.01);
(Continued)

(58) Field of Classification Search
CPC ....... A21D 13/066; A21D 2/186; A21D 2/266
See application file for complete search history.

(56) References Cited

U.S. PATENT DOCUMENTS 4,976,982 A * 12/1990 Gillmore ............... A23L 33/24
426/557
2006/0073258 A1 * 4/2006 Korolchuk ............ A23L 7/115
426/622
(Continued)

FOREIGN PATENT DOCUMENTS

| EP | 1749450 | 2/2007 |
|----|---------|--------|
| GB | 2447978 | 10/2008 |
| WO | 03075673 | 9/2003 |

OTHER PUBLICATIONS

Sosolski. "Functional Properties of Rapeseed Flours, Concentrates and Isolate" Journal of Food Science vol. 41 1976. http://onlinelibrary.wiley.eom/doi/10.1111/j. 1365-2621.1976.tb01168.x/pdf.*
(Continued)

*Primary Examiner* — Katherine D Leblanc
(74) *Attorney, Agent, or Firm* — K&L Gates LLP

(57) ABSTRACT

The present invention generally relates to gluten-free food products. In particular, the present invention concerns gluten-free pasta comprising a starch-containing material and *Brassicaceae* seed protein. A further aspect of the invention is a process for manufacturing gluten-free pasta.

14 Claims, 1 Drawing Sheet

(51) Int. Cl.
*A21D 10/02* (2006.01)
*A21D 13/80* (2017.01)
*A21D 2/18* (2006.01)
*A23L 7/109* (2016.01)

(52) U.S. Cl.
CPC . *A23V 2200/304* (2013.01); *A23V 2250/5118* (2013.01); *A23V 2250/548* (2013.01)

(56) References Cited

U.S. PATENT DOCUMENTS

| | | | | |
|---|---|---|---|---|
| 2007/0031564 A1* | 2/2007 | Fontanesi | ............. | A23L 29/212 |
| | | | | 426/557 |
| 2007/0160728 A1* | 7/2007 | Rudie | .................... | A21D 2/266 |
| | | | | 426/510 |
| 2007/0190216 A1* | 8/2007 | Seiler | .................... | A21C 1/006 |
| | | | | 426/557 |
| 2009/0286961 A1 | 11/2009 | Tang | | |
| 2010/0119652 A1* | 5/2010 | Palav | .................... | A21D 2/165 |
| | | | | 426/62 |
| 2011/0104348 A1* | 5/2011 | Murray | ................. | A21D 2/266 |
| | | | | 426/431 |
| 2011/0318452 A1* | 12/2011 | Villota | .................... | A23L 7/109 |
| | | | | 426/18 |
| 2012/0207880 A1* | 8/2012 | Shin | ....................... | A21D 13/04 |
| | | | | 426/61 |
| 2013/0129864 A1* | 5/2013 | Brandt | .................... | A21D 2/186 |
| | | | | 426/62 |

OTHER PUBLICATIONS

Clark, Melissa. "Making fresh pasta is easier than you think" May 18, 2015. https://www.seattletimes.com/life/food-drink/making-fresh-pasta-is-easier-than-you-think/#:~:text=For%20example%2C%20although%20you%20can,can%20also%20be%20very%20soft. (Year: 2015).*

"Semolina" Retrieved Sep. 8, 2021 https://en.wikipedia.org/wiki/Semolina (Year: 2021).*

Scientific Opinion on the safety of "rapeseed protein isolate" as a Novel Food ingredient, EFSA Panel on Dietetic Products, Nutrition and Allergies (NDA), EFSA Journal, 2013, vol. 11, Issue No. 10:3420, Oct. 25, 2013, pp. 1-23, XP055180475.

European Office Action for Application No. 16 790 576.9-1106 dated Sep. 7, 2020.

* cited by examiner

Fig. 1
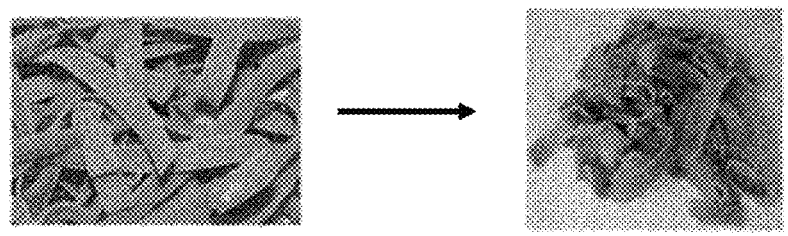
Fig. 2
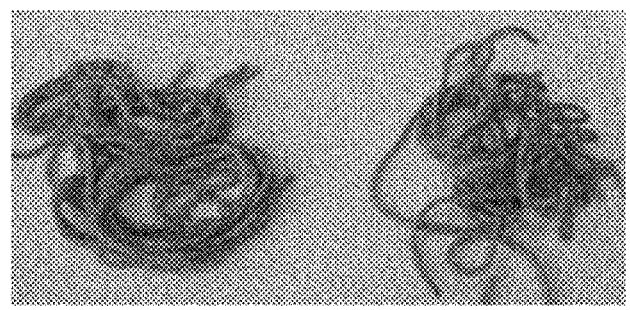
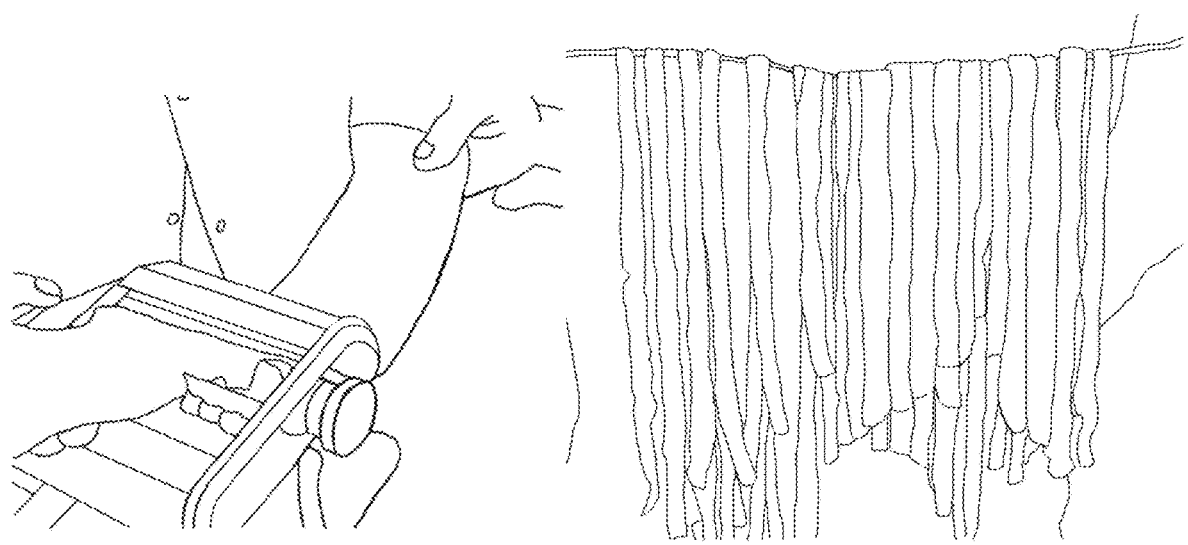
Fig. 3
Fig. 4

GLUTEN-FREE PASTA COMPRISING *BRASSICACEAE* SEED PROTEIN

CROSS REFERENCE TO RELATED APPLICATIONS

The present application is a National Stage of International Application No. PCT/EP2016/076257, filed on Oct. 31, 2016, which claims priority to European Patent Application No. 15193164.9, filed on Nov. 5, 2015, the entire contents of which are being incorporated herein by reference.

FIELD OF THE INVENTION

The present invention generally relates to gluten-free food products. In particular, the present invention concerns gluten-free pasta comprising a starch-containing material and *Brassicaceae* seed protein. A further aspect of the invention is a process for manufacturing gluten-free pasta.

BACKGROUND OF THE INVENTION

Coeliac disease is a chronic inflammatory disorder of the small bowel induced in genetically susceptible people by the irritant gluten and possibly other environmental cofactors. [A. Di Sabatino et al., The Lancet, 373, 1480-1493 (2009)]. Coeliac disease is the most common lifelong dietary disorder worldwide, affecting around 1% of the European population and claimed to be "highly under-diagnosed in all countries" [K. Mustalahti et al., Annals of Medicine, 42, 587-595 (2010)]. A strict gluten-free diet remains the mainstay of safe and effective treatment. Gluten is a protein composite found in foods processed from wheat and related grain species, including barley and rye. In addition to suffers from coeliac disease, people who are gluten-intolerant or gluten sensitive are sometimes recommended or prescribed to follow a gluten-free diet. These may include people with Crohn's disease, ulcerative colitis, irritable bowel syndrome, dermatitis herpetiformis, or autism. For some non-coeliac individuals, following a gluten-free diet may be a lifestyle choice. For the food industry there is a challenge to offer gluten-free products that provide the same taste, texture and nutritional value as their gluten-containing counterparts.

Pasta is a popular and versatile food product enjoyed around the world. Pasta is made from a base of flour and water and may be formed into a variety of shapes such as spaghetti, macaroni, tagliatelle, cannelloni and noodles. Pastas are commercially available in many forms including fresh pasta and dried pasta. The word pasta is Italian for "paste" or "dough". The word "noodle" comes from the German word for the same preparation, and generally refers to pasta-like preparations made outside the Italian tradition.

The aim in making pasta and noodle dough is to transform dry flour particles into a cohesive mass that is malleable enough to be shaped, but is strong enough to stay intact when boiled. With wheat flours, the cohesiveness is provided by the gluten proteins. Pasta may be laminated or extruded. With laminated wheat pasta, a gluten network is allowed to develop before the pasta is repeatedly rolled into ever thinner sheets. This repeated lamination organizes the gluten network, compressing and aligning the protein fibres, but also spreading them out so that the dough becomes more easily stretched without snapping back. The laminated dough is then cut into the desired shape. With extruded wheat pasta, extruding the dough through a die at high pressure changes the structure of the dough by shearing the protein network apart, mixing it more intimately with starch granules and allowing broken protein bonds to re-form and stabilize the new network [McGee on food and cooking, Hodder and Stoughton, p 574 (2004)]. Elimination of gluten from the pasta dough leads to serious defects in processing and texture properties, including lack of cohesiveness of the dough, loss of shape during cooking, stickiness due to excessive starch granule swelling and lack of elasticity of the pasta.

In an attempt to provide gluten-free pasta with similar properties to gluten-containing pasta, structure-building additives have been proposed. AU2015100934 proposes the use of additives such as xanthan gum and guar gum in gluten-free pasta. These materials are hydrophilic and thus may require higher amounts of water in the pasta dough and lead to increased stickiness requiring a modified manufacturing process compared to conventional pasta. Replacing gluten with non-protein materials may also result in a product with a lower nutritional value.

Egg white proteins have been proposed in gluten-free pasta products [GB2447978]0.12)]. However, these proteins may be responsible for allergic reactions in some people and may lead to an undesirable taste, especially when used at high levels.

Not all traditional pasta and noodle varieties are held together by gluten proteins. Starch noodles and rice noodles are particularly popular in Asia. These noodles do not contain gluten, they are held together by amylose rather than protein and have different texture and eating properties to wheat noodles. However, it would be desirable to be able to offer gluten-free noodles having the same or similar texture and eating properties as wheat noodles.

The nutritional quality of wheat protein is low in certain amino acids such as lysine. U.S. Pat. No. 8,535,907 describes the using canola protein concentrate to improve the nutritional content of foods including pasta.

Hence, there remains a need to provide gluten-free pasta which matches the properties of wheat pasta more closely, provides good nutrition and contains ingredients which are attractive to the consumer. In addition, ingredients used to replace gluten should be relatively inexpensive and provide the desired functionality at a low level of addition so as to allow gluten-free pasta to be manufactured at a low cost. Ideally, gluten-free pasta formulations should be capable of being produced on standard pasta production equipment, with similar processing times.

Several species of *Brassicaceae* or *Cruciferae* have become important agricultural crops around the world. Among these, canola or rapeseed (*Brassica napus* and *Brassica rapa*, formerly *Brassica campestris*), oriental and brown mustard (*Brassica juncea*), black mustard (*Brassica nigra*) and yellow mustard (*Sinapis alba* synonym *Brassica hirta*) are important in the global oilseed economy [J. P. D. Wanasundara, Critical Reviews in Food Science and Nutrition, 51, 635-677 (2011)]. A major commercial use of *Brassicaceae* seeds is the production of edible oils, but at present *Brassicaceae* seed proteins are primarily used for feeding livestock.

An object of the present invention is to improve the state of the art and to provide an improved gluten-free pasta to overcome at least some of the inconveniences described above, or at least to provide a useful alternative. The object of the present invention is achieved by the subject matter of the independent claims. The dependent claims further develop the idea of the present invention.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

The present invention provides in a first aspect gluten-free pasta comprising gluten-free starch-containing material and between 1 and 20 wt. % *Brassicaceae* seed protein on a dry basis. In a second aspect, the invention relates to a process for manufacturing a gluten-free pasta, the process comprising preparing a gluten-free dough comprising between 25 to 35 wt. % water and, on a dry basis, 1 to 20 wt. % *Brassicaceae* seed protein and 40 to 80 wt. % starch; and shaping the dough to form pasta.

The inventors surprisingly found that by using *Brassicaceae* seed protein in gluten-free pasta they can obtain a pasta having processing and final product characteristics approaching that of gluten-containing pasta. In particular, *Brassicaceae* seed protein permits the creation of pasta dough having good cohesion, acceptable shape stability during cooking and provides pasta having elasticity comparable to gluten-containing pasta made with wheat flour.

BRIEF DESCRIPTION OF THE FIGURES

FIG. 1 is a photograph of pasta made with amaranth flour and 10% canola protein before and after boiling for 3 minutes.

FIG. 2 is a photograph of pasta made with potato starch and 10 and 15% canola protein, after 3 min cooking. These showed good elasticity.

FIG. 3 is a photograph of gluten-free pasta being laminated.

FIG. 4 is a photograph of laminated gluten-free pasta which has been slit to form tagliatelle.

DETAILED DESCRIPTION OF THE INVENTION

Consequently the present invention relates in part to a gluten-free pasta comprising gluten-free starch-containing material and between 1 and 20 wt. % *Brassicaceae* seed protein on a dry basis, for example between 5 and 18 wt. % *Brassicaceae* seed protein on a dry basis. The term gluten-free in the current specification refers to products with less than 20 ppm gluten, which is in agreement with the definition from Codex *Alimentarius* Standard 118-1979. The gluten-free starch-containing material may be starch itself, or it may for example be a non-gluten flour comprising starch such as rice flour. The gluten-free starch-containing material may have a particle size distribution D90 less than 1000 μm, for example it may have a particle size distribution D90 of less than 300 μm, for example between 10 and 300 μm. The D90 value is a common method of describing a particle size distribution. The D90 is the diameter where 90% of the mass of the particles in the sample have a diameter below that value. The D90 value may be measured for example by a laser light scattering particle size analyser.

Removal of gluten from pasta formulations in turn reduces the protein content and therefore the nutritional value of the pasta. Using *Brassicaceae* seed protein as a gluten replacement, rather than for example gums and emulsifiers, provides a more nutritious gluten-free pasta. As *Brassicaceae* seeds are generally grown for their oil, *Brassicaceae* seeds may provide an inexpensive source of protein as a by-product of oil production. It is therefore advantageous to be able to use *Brassicaceae* seed protein to manufacture gluten-free pasta.

The gluten-free pasta of the invention is held together predominantly by protein, the protein comprising *Brassicaceae* seed protein. This is in contrast to starch noodles and rice noodles which are held together predominantly by amylose. Without wishing to be bound by theory, the inventors believe that it is this protein structure in the pasta of the invention which provides a texture and eating properties similar to those of wheat noodles. The gluten-free pasta of the invention may comprise further ingredients, for example it may comprise sodium chloride or aqueous solutions of salts such as kansui, used in ramen noodles. The gluten-free pasta of the invention may comprise vegetable oils, for example walnut or olive oils, or noodles may contain oils absorbed during frying. The gluten-free pasta of the invention may comprise vegetables purees such as spinach or tomato, mushrooms, cheeses, herbs, spices and other seasonings. As is traditional for many pasta varieties, the gluten-free pasta of the invention may comprise eggs.

The term starch is used in the conventional manner to refer to a carbohydrate consisting of a large number of glucose units joined by glycosidic bonds. Starch does not contain gluten. The starch-containing material comprised within the gluten-free pasta of the invention may be gluten-free ground cereals, pulses, roots or mixtures of these. The gluten-free starch-containing material comprised within the gluten-free pasta of the invention may be selected from the group consisting of maize starch, corn meal, buckwheat flour, millet flour, amaranth flour, *quinoa* flour, potato starch, sweet potato flour, tapioca starch, rice starch, rice flour, sorghum flour, bean flour, pea flour, pea starch, soy flour, chickpea flour, cowpea flour, lentil flour, bambara bean flour, lupin flour, chestnut flour, flaxseed flour, chia flour and combinations of these. For example the starch-containing material may comprise potato starch which provides a pasta with a particularly good elasticity, for example the starch-containing material be a mixture of corn starch, potato starch and rice flour. The starch-containing material may be potato starch or tapioca starch. The starch in the starch-containing material may be pre-gelatinized starch. The potato starch comprised within the pasta of the invention may be a pre-gelatinized potato starch. The gluten-free starch-containing material may be a mixture of tapioca starch, potato starch and rice flour. The gluten-free starch-containing material of the gluten-free pasta of the invention may comprise between 30 and 50 wt. % flour. For example the gluten-free starch-containing material may contain between 10 and 30 wt. % corn starch, between 30 and 50 wt. % potato starch and between 30 and 50 wt. % rice flour. The gluten-free pasta of the invention may comprise a natural source of non-starch polysaccharides such as from fruit, vegetable, cereal, pseudocereal or legume source. Adding non-starch polysaccharides fibre ingredients improves the shape retention of the pasta. For example the non-starch polysaccharides may be gluten-free cereal bran, beet fibre, fruit pectin or pea fibre. To further enhance the nutritional value of the pasta, the gluten-free pasta of the invention may also comprise iron, folic acid, and other B vitamins.

The *Brassicaceae* seed protein comprised within the gluten-free pasta of the invention may be obtained from seeds selected from the group consisting of *Brassica napus, Brassica rapa, Brassica juncea, Brassica nigra, Brassica hirta* and combinations of these. The *Brassicaceae* seed protein may for example be rapeseed or canola protein. Canola is the Canadian oilseed crop developed primarily for the purpose of edible oil. It was naturally bred to reduce erucic acid in the oil and glucosinolates in the meal. The plants are cultivars of either rapeseed (*Brassica napus*) or field mustard/turnip rape (*Brassica rapa*). Recent cross-breeding of multiples lines of *Brassica juncea* have enabled this mustard variety to also be classified as a Canola variety. Canola is defined as seeds of the genus *Brassica* (*Brassica napus, Brassica rapa* or *Brassica juncea*) from which the oil shall contain less than 2% erucic acid in its fatty acid profile and the solid component shall contain less than 30 micromoles of any one or any mixture of 3-butenyl glucosinolate, 4-pentenyl glucosinolate, 2-hydroxy-3 butenyl glucosinolate, and 2-hydroxy-4-pentenyl glucosinolate per gram of air-dry, oil-free solid. Canola protein forms aggregates (for example upon heat treatment) which mimic the rheological characteristics of hydrated gluten proteins making canola protein particularly suitable as a gluten replacer in pasta.

The *Brassicaceae* seed protein comprised within the gluten-free pasta of the invention may be in the form of a protein isolate or a protein concentrate. Concentrates are typically considered to be between 35-89 wt. % protein on a dry basis, while 90 wt. % protein and above is considered as protein isolate. Protein isolates may be obtained from defatted *Brassicaceae* seeds by a number of extraction and purification processes, such as extraction with alkaline solution, enzymatic extraction, methods involving the formation of a protein micellar mass, salting out the protein with NaCl or combinations of these processes. Methods for obtaining Canola protein isolates are summarized by Tan [S. H. Tan et al., J Food Sci., 76, R16-R28 (2011)]. Non-starch hydrocolloids are sometimes used in gluten-free products, acting to stabilize the product's structure. However, consumers may prefer pasta made from only a small number of familiar ingredients and so it is beneficial that by using *Brassicaceae* seed protein as a gluten replacer the addition of non-starch hydrocolloids may be avoided. The gluten-free pasta of the invention may be free from agar-agar, carrageenan, gum Arabic, tragacanth, locust bean gum, guar gum, cellulose derivatives (for example hydroxypropyl methylcellulose, methylcellulose and carboxymethylcellulose) and xanthan gum. The gluten-free pasta of the invention may be free from modified starch; that is starch prepared by enzymatically, or chemically treating native starch, thereby altering its properties.

The *Brassicaceae* seed protein in the gluten-free pasta of the invention need not be in the form of a complex, for example the gluten-free pasta may contain less than 5 ppm of metals such as silver or copper complexed with *Brassicaceae* seed protein, for example less than 2 ppm metals such as silver of copper complexed with *Brassicaceae* seed protein, for example less than 1 ppm metals such as silver of copper complexed with *Brassicaceae* seed protein, for example the gluten-free pasta may be free from complexes of *Brassicaceae* seed protein with metals such as silver or copper.

The gluten-free pasta of the invention may comprise other proteins in addition to the *Brassicaceae* seed protein, for example the gluten-free pasta of the invention may comprise plant proteins such as soy, pea, chickpea and carob proteins. Additional proteins may provide nutritional enhancement of the pasta.

Milk proteins and egg proteins are used in a number of pasta compositions. Unfortunately, some consumers are allergic to milk or egg proteins, or chose not to eat them due to their animal origin, e.g. vegans. It is therefore beneficial that, by using *Brassicaceae* seed protein as a gluten replacer, an acceptable pasta may be obtained without the use of milk or egg proteins. The gluten-free pasta of the invention may be free from milk protein. The gluten-free pasta of the invention may be free from egg protein.

The gluten-free pasta of the invention may be a filled pasta such as ravioli, tortellini, tortelloni, agnolotti, anolini or Chinese style dumplings (where pasta encases seasoned morsels of meat, shellfish or vegetables). Filled pastas are particularly challenging for gluten-free formulations as the manufacturing process generally involves forming a pasta sheet by lamination or extrusion and then stretching it around the filling. This requires good elasticity and cohesiveness. It is beneficial that the dough of the gluten-free pasta of the invention may be used to encase a filling without significantly tearing or breaking.

The gluten-free pasta according to the invention may be a dried pasta, or it may be a chilled ready-to-cook pasta. Chilled, ready-to-cook pasta (sometimes called chilled fresh pasta) provides the consumer with the taste and texture of fresh pasta without the trouble of making it from basic ingredients. Chilled ready-to-cook pasta can be particularly desirable when it is formed into complex shapes or around fillings in a manner which would be difficult to reproduce at home. The gluten-free pasta of the present invention may be comprised within a prepared dish, for example it may be comprised within a frozen or chilled gluten-free pasta-containing dish such as a lasagne. Chilled food is typically maintained at temperatures between 2 and 8° C. in storage and transit, while frozen food is typically maintained below −18° C. The gluten-free pasta of the invention may be chilled or frozen.

The gluten-free pasta according to the invention may be an instant noodle. Instant noodles are a precooked and usually dried noodles, typically sold as a noodle block with flavouring powder and/or seasoning oil, usually in a separate packet; though in the case of cup noodles the flavouring is often loose in the cup. Instant noodles are cooked or soaked in boiling water, generally for a short period of between 1 and 3 minutes. The instant noodles may be dried by flash frying or by air drying. By including *Brassicaceae* seed protein in gluten-free formulations, noodles can be produced which can be dried by frying to form instant noodles without the problems of cracking or crumbling usually associated with gluten-free noodles.

In another aspect, the invention provides a process for manufacturing a gluten-free pasta, the process comprising preparing a gluten-free dough comprising between 25 to 35 wt. % water and, on a dry basis, 1 to 20 wt. % *Brassicaceae* seed protein and 40 to 80 wt. % starch; and shaping the dough to form pasta. At least part of the *Brassicaceae* seed protein comprised within the gluten-free dough may be in its native form, for example at least 20 wt. % of the *Brassicaceae* seed protein comprised within the gluten-free dough may be in its native form. The starch in the process of the invention may be provided in the form of a gluten-free starch-containing material such as rice flour. The *Brassicaceae* seed protein does not need to be mixed with water separately from the other ingredients. For example, the process for manufacturing a gluten-free pasta may comprise preparing a mix of dry ingredients comprising 1 to 20 wt. % *Brassicaceae* seed protein and 40 to 80 wt. % starch and mixing sufficient water into the dry ingredients to form a dough comprising between 25 to 35 wt. % water; and shaping the dough to form pasta. The *Brassicaceae* seed protein does not need to be foamed, or complexed with charged metal ions such as silver or copper. The dough may be shaped by extrusion, for example extrusion through a die. By extruding the pasta through a series of holes a pasta such as spaghetti may be formed, or a n extruded sheet of pasta may be extruded through a narrow slot. The extruded sheet of pasta may be passed through a slitter to form ribbon shapes, or it may be cut into shapes to enclose fillings. The dough may be shaped by lamination (e.g. rolling the dough gently and repeatedly to form an ever thinner sheet). A filing may be encased by the pasta in the process of the invention. For example, the dough may be laminated and then used to encase a filling. *Brassicaceae* seed protein provides sufficient binding and network forming properties to allow successful lamination. Repeated rolling organizes the protein network, compressing and aligning the protein fibres, but also spreading them out so that the dough becomes more easily stretched without snapping back. The laminated dough may then be cut into the desired shape such as ribbons, or into cases to enclose fillings.

The formed pasta in the process of the invention may be heat-treated before being chilled and packed. This pretreatment gelatinises the starch in the pasta, denatures protein and promotes its polymerization making it structurally stronger and easier to cook. The heat treatment may be performed at a temperature of between 80 and 120° C. for between 1 and 10 minutes. The heat treatment may be pasteurisation, for example the formed pasta may be held at 105° C. for 2 minutes. The heat treatment may be performed by the application of steam.

The pasta in the process of the invention may be dried, for example the pasta in the process of the invention may be dried in hot air at a temperature above 90° C. Drying above 90° C. provides particularly good results with pasta comprising *Brassicaceae* seed protein. The formed pasta in the process of the invention may be steamed or boiled before being dried by hot air drying or deep frying. Pasta of the instant noodle type may be produced by laminating or extruding a sheet which is then slit into noodles. Preferably the noodles are laminated. Once the noodles are formed they may be steam-cooked or boiled to make them structurally stronger. Preferably the noodles are pre-cooked by steam-treatment. The noodles may be formed into a nest or block of looped noodles before being dried, for example by deep-frying. The deep-frying may be preceded by a brief immersion of the noodles in cold water, for example for immersion for 1-5 s, which helps avoid problems of stickiness.

Those skilled in the art will understand that they can freely combine all features of the present invention disclosed herein. In particular, features described for the products of the present invention may be combined with the process of the present invention and vice versa. Further, features described for different embodiments of the present invention may be combined. Where known equivalents exist to specific features, such equivalents are incorporated as if specifically referred to in this specification. Further advantages and features of the present invention are apparent from the figure and non-limiting examples.

EXAMPLES

Example 1: Extruded Pasta Containing Canola Protein Isolate

Trials were carried out to evaluate the performance of canola protein isolate as a gluten replacer in gluten-free pasta. Reference pasta was produced from dough based on wheat flour containing 30% water. Canola protein isolate (Isolexx™—91.4% protein) was purchased from BioExx Specialty Proteins Ltd. For the gluten free pasta, canola protein isolate was added to a gluten-free starch or flour to obtain 3, 5, 10 and 15% canola protein in the dry mix. The starches used were corn, tapioca, and potato; and the flours were *quinoa*, amaranth, rice, and corn meal. Control pasta samples were 3.0 prepared without addition of canola protein. Pasta dough was prepared by adding water to the dry mix to a final water content of 28-32% water, and then mixing for 15 min in a Hobart mixer (model N-50, Ontario, Canada) at speed position 1. The dough was extruded at room temperature using laboratory scale extruder (Dolly, La Monferrina, Castell'Alfero-AT, Italy) fitted with dies having perforation of 0.7 mm in diameter. Pasta was stored at 4° C. in a hermetically sealed bag.

All doughs containing canola protein were appropriate for making pasta by cold-extrusion. In contrast, without canola protein, the doughs obtained using starches, *quinoa* flour or amaranth flour were not able to form pasta by cold extrusion mainly due to a lack of cohesiveness.

Pasta was cooked in boiling water for 2 to 3 minutes. All the pasta containing canola was able to maintain its shape after cooking, but best results were obtained at levels of canola protein above 10% (FIG. 1). Technical tasting showed that pasta produced with potato starch and canola protein (FIG. 2) showed particularly good elasticity, comparable with the wheat flour pasta. Elasticity increased with canola protein content.

Example 2: Laminated Pasta Containing Canola Protein Isolate

A laminated gluten-free pasta was prepared. 50 g of canola protein isolate, 320 g rice starch, 100 g liquid pasteurized whole egg and 30 g water were mixed to form a dough. The dough was rested before being rolled by repeatedly passing it through a pasta laminating machine (FIG. 3) until a suitable thickness was achieved for tagliatelli. The resulting pasta sheet was then slit to form pasta ribbons (FIG. 4). The canola-containing gluten-free pasta dough had sufficient cohesiveness to allow it to be laminated and cut without problems.

The invention claimed is:

1. A gluten-free pasta comprising a gluten-free starch-containing material, eggs, and between 10 and 20 wt. % canola protein on a dry basis of the gluten-free pasta, wherein the gluten-free pasta is free of any gum and free of any emulsifier, the gluten-free starch-containing material has a particle size D90 distribution between 10 and 300 μm, and the gluten-free starch-containing material is selected from the group consisting of corn starch, tapioca starch, potato starch, quinoa flour, amaranth flour, rice flour, and corn meal flour.

2. The gluten-free pasta according to claim 1, wherein the canola protein is in the form of a protein isolate or a protein concentrate.

3. The gluten-free pasta according to claim 1, which is free from milk protein.

4. The gluten-free pasta according to claim 1, which is a filled pasta.

5. The gluten-free pasta according to claim 1, which is a chilled ready-to-cook pasta or an instant noodle.

6. A process for manufacturing a gluten-free pasta, the process comprising:
   preparing a gluten-free dough comprising eggs, between 25 to 35 wt. % water and, on a dry basis of the dough, 10 to 20 wt. % canola protein and 40 to 80 wt. % starch; and shaping the gluten-free dough to form the gluten-free pasta, wherein the gluten-free pasta is free of any gum and free of any emulsifier, the gluten-free dough has a particle size D90 distribution between 10 and 300 μm, and the gluten-free starch-containing material is selected from the group consisting of corn starch, tapioca starch, potato starch, quinoa flour, amaranth flour, rice flour, and corn meal flour.

7. The process according to claim 6 comprising encasing a filing in the gluten-free pasta.

8. The process according to claim 6 comprising heat-treating the gluten-free pasta and then chilling and packing the heat-treated gluten-free pasta.

9. The process according to claim 6 comprising heat-treating by steaming or boiling the gluten-free pasta and then hot air drying or deep frying the steamed or boiled gluten-free pasta.

10. The process according to claim 6 comprising drying the gluten-free pasta in hot air at a temperature above 90° C.

11. The gluten-free pasta according to claim 1, wherein the pasta shape is selected from the group consisting of spaghetti, macaroni, tagliatelle, cannelloni, noodles and combinations thereof.

12. The gluten-free pasta according to claim 1, further comprising a natural source of non-starch polysaccharide fibers.

13. The process according to claim 6, wherein the shaping of the gluten-free dough to form the gluten-free pasta is performed by extrusion.

14. The process according to claim 6, wherein at least 20 wt.% of the canola protein in the gluten-free dough is in its native form.

* * * * *